Jan. 20, 1959 W. C. SCHMIDT 2,869,840
AGITATING APPARATUS
Filed May 25, 1956
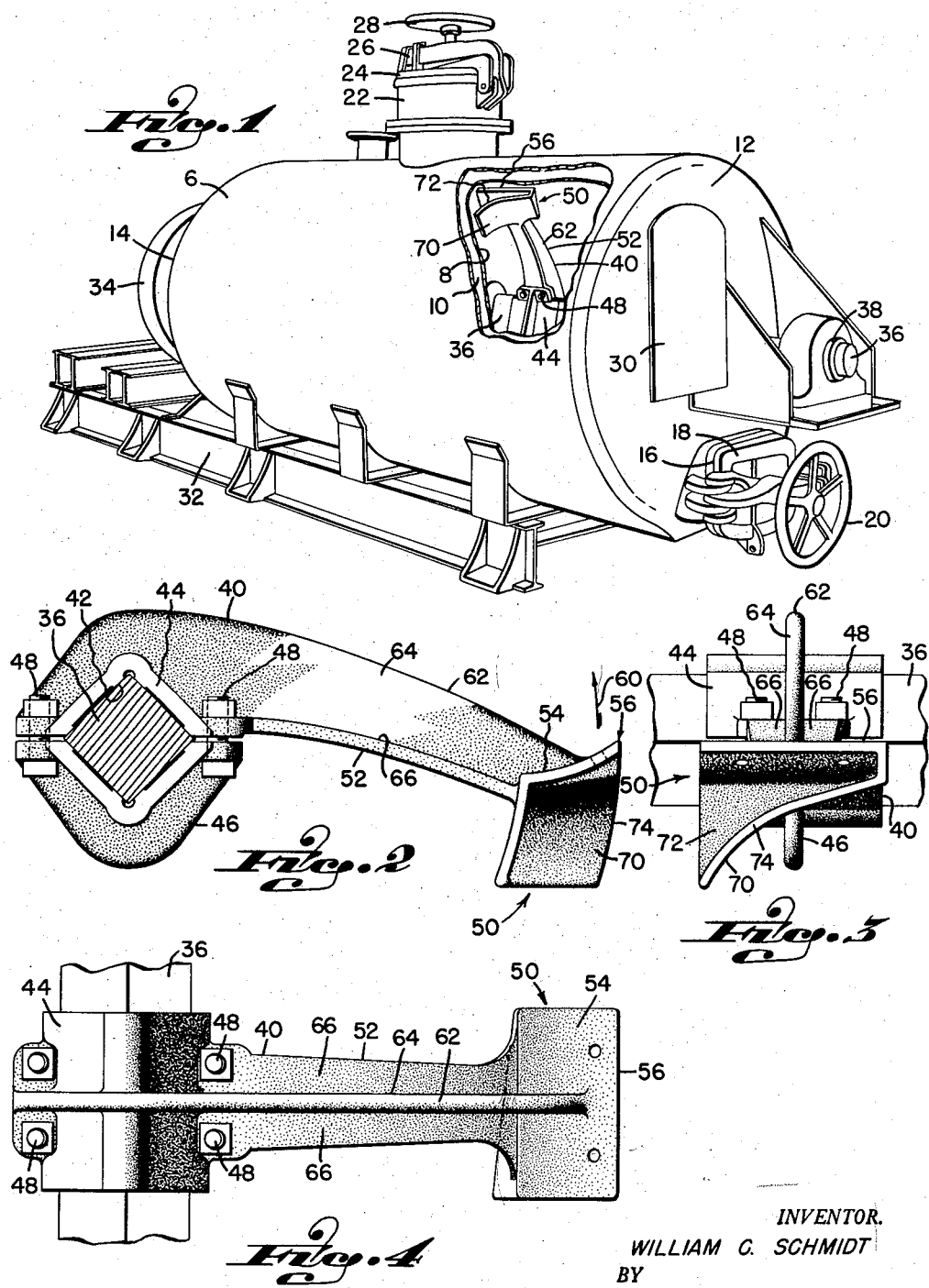
INVENTOR.
WILLIAM C. SCHMIDT
BY
J Warren Kenney, Jr.
ATTORNEY

United States Patent Office 2,869,840
Patented Jan. 20, 1959

2,869,840

AGITATING APPARATUS

William C. Schmidt, Cincinnati, Ohio, assignor to The Cincinnati Butchers' Supply Company, Cincinnati, Ohio, a corporation of Ohio Application May 25, 1956, Serial No. 587,382

11 Claims. (Cl. 259—45)

The present invention relates to improvements in an apparatus and method for agitating substances undergoing cooking or rendering in a heated vessel or shell, to effect separation of solids from the liquid content of the batch. One form of substance which generally requires a cooking and agitating treatment for separating the solids from the liquid content is the waste from slaughter houses or abattoirs, generally consisting of animal fat, bones, entrails and other waste products not considered suitable for human consumption.

An object of the present invention is to provide improved technique and equipment for the cooking or rendering of fatty wastes, by the dry rendering process.

Another object is to improve upon the rendering process by providing means to most effectively intermix the constituents of the batch, distribute the same over the heated area of the cooker, and discharge the spent substance, with a minimum expenditure of time, labor and expense.

A further object is to provide an improved form of agitator, simple and effective in its operation, to ensure thorough mixing, distribution and control of the batch, to the end that economies of processing are achieved without the need for radical changes in existing equipment.

These and other objects are attained by the means described herein and illustrated upon the accompanying drawing, in which:

Fig. 1 is a perspective view of a dry rendering cooker, part being broken away to show the incorporation of the present invention therein.

Fig. 2 is a side elevational view of an agitator element embodying the invention, and shown applied to an agitator shaft.

Fig. 3 is an end view looking from right to left of Fig. 2.

Fig. 4 is a top plan view of the agitator element, as seen looking downwardly on Fig. 2.

Referring to Fig. 1, the character 6 indicates a large drum generally cylindrical in form, in which is fitted a second drum or shell 8 of lesser size, with a space 10 provided therebetween to serve as a jacket space into which steam may be fed for heating the inner shell. The ends of the cylindrical drums or shells are closed by end members 12 and 14, and one of these may be provided with a discharge port 16 normally sealed by means of a suitable door 18 held firmly closed with the aid of mechanical clamping apparatus including the hand wheel 20, for example. The nature of the discharge door operating means is a matter wholly immaterial to the present invention, and need not therefore be described in detail. It may be stated simply that the discharge port 16, when exposed by displacement of the door, affords an outlet through which may be discharged the residue and cracklings remaining after the fat has been rendered from the raw substance and drawn from the inner shell in customary manner.

At the top of the cooker is a charging hopper 22 through which the raw substance to be rendered may be fed into the inner shell. The charging hopper normally is kept sealed by means of a closure member 24, which by preference, though not of necessity, is normally held in place by a clamping apparatus 26 including the hand wheel 28. The charging hopper structure constitutes no part of the present invention, and may therefore be conventional in character. Conventional also are the manhole cover 30, the frame or bed 32 which supports the drum 6, and the power means 34 at the rear end of the drum, which serves to rotate the agitator shaft 36 in forward or reverse directions according to the wishes of an operator or attendant. Opposite ends of the agitator shaft may be supported in bearings such as 38, located at opposite ends of the cooker drum, and said bearings support the shaft axially of the inner cylinder or shell 8. Suitable packings, not shown, are provided as usual to preclude leakage along the shaft where the shaft passes through the end walls of the cooker.

The agitator shaft 36 carries a plurality of agitators 40, which may be spaced apart along the length of the shaft interiorly of the shell 8. The shaft, if desired, may be squared interiorly of the shell to accommodate a square opening 42 of each agitator hub 44. Fixation of the hub to the agitator shaft may be achieved in any suitable manner, as by means of a cap 46 clamped onto the hub and against the shaft by screws 48 or other fasteners. Each agitator includes a head 50, and an arm 52 intermediate the head and the hub 44.

Arrows applied to Figs. 1 and 2 indicate the normal or forward direction of movement of the agitators occurring during the cooking cycle, it being understood that the agitator shaft is capable also of reversal at times. The head of the agitator comprises by preference an integral enlargement shaped as shown, to provide a deflecting face 54 having a leading or forward edge 56 that moves in close proximity to the inner wall of the shell 8, to skim and dislodge substance adhering to said wall. The deflecting face 54 of the agitator head preferably is concave as shown, the curvature thereof beginning at the skimming edge 56 and extending generally toward the agitator shaft, so that substance engaged by the deflecting face is directed inward and centerward of the cooker shell to achieve thorough intermixing of the batch constituents and constant displacement of cooked material from the heated area of the shell.

In the preferred construction, the deflecting face 54 is substantially parallel to the agitator shaft, that is, all points on said face which are equidistant from the shaft lie in a plane which includes the shaft axis. Moreover, the leading or skimming edge 56 preferably is parallel or approximately parallel to the shaft axis, and lies in a straight line extending transversely of the head. The straight line disposition of the skimming edge induces no deflection of the cooker contents in any direction other than toward the agitator shaft, the advantage of this being to maintain uniformity of distribution throughout the length of the cooker, particularly during the cooking cycle when the substance undergoing cooking is not to be concentrated at either end of the shell, if the substance is characteristically quite solid or plastic of nature.

The arm 52 of the agitator advantageously may be bent or curved longitudinally as shown, in a direction opposite to the direction of forward advancement indicated by the arrow 60 of Fig. 2. Approximately the same curvature is imparted to the leading edge 62 of a slicing rib 64 which extends lengthwise of the agitator arm intermediate the head 50 and the hub 44. It may be noted that the slicing rib protrudes in the direction of normal travel of the agitator, and at either side of the rib is provided a curved paddle face or area 66 which is substantially normal to the plane of the rib. The curvature of the paddle area 66 is opposite to the curvature of the deflecting face 54 of the head, the purpose of this being to drive cooked material projected inwardly from the shell by the skimming edge 56, through the relatively uncooked material moved outwardly by the paddle area 66, thereby to ensure thorough intermixing of the material in different stages of processing. The slicing action of rib 64 tends to mutilate and separate any solids in the mass undergoing agitation and cooking, and the reverse curvature of the rib and paddle area enhances the slicing action by moving the mass lengthwise along the rib under pressure imposed by advancement of the agitator through the mass. As will be understood, a substantial portion of the mass gravitates and remains in the lower area of the shell during agitation and cooking, and the agitators work this comparatively static mass.

As the substance undergoes agitation and cooking in the presence of heat applied to the shell 8, it becomes quite fluid and the fat rendered out is drawn off periodically through valves or cocks, or by other suitable means, not shown. Eventually, therefore, the content of the cooker is reduced largely to residual solid matter such as bone particles and crackling, and when sufficient fat has been extracted the residue is to be discharged from the cooker. Discharge of the residue may easily and quickly be effected automatically, by means presently to be described.

Referring to the drawing, 70 indicates a propulsion face disposed obliquely to the skimming edge 56 and to the plane of rotation of the agitator arm. The propulsion face may constitute a rear wall of a fin 72 formed integrally with the agitator head and in trailing relationship to the edge 56 and deflecting face 54. The face 70 is bounded by an outer curved edge 74 (Fig. 3) which trails the skimming edge 56 during normal advancement of the agitator; however, spaced points on the trailing edge 74 seen in Fig. 3 are progressively farther spaced from the skimming edge 56 in one direction lengthwise of the latter. This is evident particularly upon Fig. 3, wherein is clearly shown a divergency between the edges 74 and 56.

With further reference to Fig. 3, it should readily be understood that rotation of the agitator shaft 36 in one direction will advance the leading edge 56 through the mass undergoing agitation, whereas rotation of the shaft in the opposite direction will advance the propulsion face 70 through the mass to impart thereto a flow lengthwise of the agitator shaft 36, or to the right in Fig. 3. The latter condition assumes a downward advancement of face 70 in Fig. 3, deflecting the mass to the right, and such advancement downwardly occurs with reversal of the agitator shaft or rotation thereof in a direction opposite to that indicated by the arrow in Fig. 1. Accordingly, whenever the agitator shaft is rotated in reverse direction, the propulsion face 70 will act to urge the contents of the cooker toward one end thereof, that is, toward the end 12 where discharge of the contents may occur upon opening the door of discharge port 16. In this manner the residue remaining in the cooker after withdrawal of the liquid fat may quickly and easily be discharged from the cooker to prepare it for reception of a fresh charge to be introduced through the hopper 22.

It should be understood that various changes in the structural details of the device may be made, within the scope of the appended claims, without departing from the spirit of the invention.

What is claimed is:

1. An agitator for working a mass of substance within a dry rendering cooker of the type including a cylindrical shell closed at its ends, one end having a closable discharge port therein, and a rotatable shaft extending axially of the shell, said agitator comprising an arm, means at one end of the arm securing said arm to the shaft radially of the shell, and a head at the opposite end of the arm, said head including a skimming edge in close proximity to the shell for dislodging substance adhering to the inside wall of the shell, a deflecting face on the head disposed for directing toward the agitator shaft the substance dislodged from the shell wall by the skimming edge aforesaid, and a propulsion face on the head disposed obliquely to the plane of rotation of the arm, for moving the agitated substance toward the discharge port at one end of the shell.

2. An agitator for working a mass of substance within a dry rendering cooker of the type including a cylindrical shell closed at its ends, one end having a closable discharge port therein, and a rotatable shaft extending axially of the shell, said agitator comprising an arm, means at one end of the arm securing said arm to the shaft radially of the shell, and a head at the opposite end of the arm, said head including a curved face having a leading edge in substantial parallelism with the axis of rotation of the agitator shaft, said leading edge being disposed in close proximity to the shell for dislodging substance adhering to the inside wall of the shell, and the curvature of said face being concave and extending from said leading edge inwardly in the general direction of the shaft axis, to induce movement of substance toward the shaft as the shaft is rotated in one direction, and means on the head operative upon reversal of shaft rotation, to move agitated substance toward the discharge port at one end of the shell.

3. An agitator for working a mass of substance within a dry rendering cooker of the type including a cylindrical shell closed at its ends, one end having a closable discharge port therein, and a rotatable shaft extending axially of the shell, said agitator comprising an arm, means at one end of the arm securing said arm to the shaft radially of the shell, and a head at the opposite end of the arm, said arm intermediate the head and said securing means being curved in the plane of movement of the arm about the shaft axis, a slicing rib on the arm having a leading edge extending from the head to a location near the agitator shaft, and a paddle area on the arm transverse to the slicing rib at a location remote from the leading edge of said rib, the paddle area being longitudinally curved in a direction opposite to that at which the arm moves during forward rotation, a curved face on the head and having a leading edge in substantial parallelism with the axis of rotation of the agitator shaft, said leading edge of the curved face being disposed in close proximity to the shell for dislodging substance adhering to the inside wall of the shell, and the curvature of said face being concave and extending from the leading edge of said face inwardly in the general direction of the shaft axis, to induce movement of substance toward the shaft as the shaft is rotated.

4. Structure as specified in claim 3, wherein is included a propulsion fin on the head of the agitator arm, said fin being disposed obliquely to the plane of rotation of the arm, for moving the agitated substance toward the discharge port upon reversal of rotation of the agitator shaft.

5. An agitator for working a mass of substance within a cylindrical shell closed at its ends, one end having a closable discharge port therein, and a rotatable shaft having a forward direction of rotation, said shaft extending axially of the shell, said agitator comprising an arm, means at one end of the arm securing said arm to the shaft transversely thereof, and a head at the opposite end of the arm, said arm intermediate the head and said securing means being curved in the plane of movement of the arm about the shaft axis, a slicing rib on the arm having a leading edge extending from the head to a location near the agitator shaft, and a paddle area on the arm transverse to the slicing rib at a location remote from the leading edge of said rib, the paddle area being longitudinally curved in a direction opposite to that at which the arm moves during forward rotation, a curved deflecting face on the head and having a leading edge in substantial parallelism with the axis of rotation of the agitator shaft, said leading edge of the curved face being disposed in close proximity to the shell for dislodging substance adhering to the inside wall of the shell, and the curvature of said face being opposite to the curvature which characterizes the paddle area of the arm, thereby to induce movement of substance dislodged as stated, in the general direction of the agitator shaft.

6. An agitator for working a mass of substance within a cylindrical shell closed at its ends, one end having a closable discharge port therein, and a rotatable shaft having a forward direction of rotation, said shaft extending axially of the shell, said agitator comprising an arm, means at one end of the arm securing said arm to the shaft transversely thereof, and a head at the opposite end of the arm, said arm intermediate the head and said securing means being curved in the plane of movement of the arm about the shaft axis, a slicing rib on the arm having a leading edge extending from the head to a location near the agitator shaft, and a paddle area on the arm transverse to the slicing rib at a location remote from the leading edge of said rib, the paddle area being longitudinally curved in a direction opposite to that at which the arm moves during forward rotation, a curved deflecting face on the head and having a leading edge disposed in close proximity to the shell for dislodging substance adhering to the inside wall of the shell, and the curvature of said face being opposite to the curvature which characterizes the paddle area of the arm, thereby to induce movement of substance dislodged as stated, in the general direction of the agitator shaft, and a propulsion face on the head disposed obliquely to the plane of rotation of the arm, for moving the agitated substance toward the discharge port of the shell upon reversal of the agitator shaft rotation.

7. An agitator for working a mass of substance within a dry rendering cooker of the type including a cylindrical shell closed at its ends, one end having a closable discharge port therein, and a rotatable shaft extending axially of the shell, said agitator comprising an arm, means at one end of the arm securing said arm to the shaft radially of the shell, and a head at the opposite end of the arm, said arm intermediate the head and said securing means including a slicing rib having a leading edge and a transverse paddle area trailing said leading edge, a curved face on the head, said face having a skimming edge in advance of said face, located in close proximity to the shell for dislodging substance adhering to the inside wall of the shell, the curved face of the head being disposed angularly to the direction of travel of the arm for directing toward the agitator shaft the substance dislodged from the shell wall by the skimming edge aforesaid, and a propulsion face on the head disposed obliquely to the plane of rotation of the arm, for moving the agitated substance toward the discharge port of the shell.

8. An agitator for working a mass of substance within a cylindrical shell closed at its ends, one end having a closable discharge port therein, and a rotatable shaft having a forward direction of rotation, said shaft extending axially of the shell, said agitator comprising an arm, means at one end of the arm securing said arm to the shaft transversely thereof, and a head at the opposite end of the arm, said arm intermediate the head and said securing means being longitudinally curved in a direction opposite to that at which the arm moves during forward rotation of the shaft, a deflecting face on the head, said face having a leading edge located in close proximity to the shell for dislodging substance adhering to the inside wall of the shell, the face aforesaid being disposed angularly to the direction of travel of the arm for directing toward the agitator shaft the substance dislodged from the shell by the leading edge aforesaid, an integral fin on the head, said fin being disposed to trail the leading edge of the head as the agitator advances, and said fin being oblique to the leading edge so as to impart movement of substance in the shell axially of the latter as the agitator shaft rotates in reverse direction.

9. An agitator for working a mass of substance within a cylindrical shell closed at its ends, one end having a closable discharge port therein, and a rotatable shaft having a forward direction of rotation, said shaft extending axially of the shell, said agitator comprising an arm, means at one end of the arm securing said arm to the shaft transversely thereof, and a head at the opposite end of the arm, said head including a skimming edge in close proximity to the shell for dislodging substance adhering to the inside wall of the shell, a deflecting face associated with the skimming edge for imposing a directional influence upon the substance in the shell, said deflecting face at all points equidistant from the shaft axis being in a plane which parallels the shaft axis, thereby imparting a scoop action to the deflecting face tending to direct substance inwardly of the shell and lengthwise of the arm, toward the agitator shaft, and a propulsion face on the head in trailing relationship to the skimming edge, disposed obliquely to the plane of rotation of the arm, for moving the agitated substance toward the discharge port of the shell upon reverse rotation of the agitator shaft.

10. An agitator for working a mass of substance within a cylindrical shell closed at its ends, one end having a closable discharge port therein, and a rotatable shaft having a forward direction of rotation, said shaft extending axially of the shell, said agitator comprising an arm, means at one end of the arm securing said arm to the shaft transversely thereof, and a head at the opposite end of the arm, said head including means to dislodge substance adhering to the inner face of the shell and direct said substance generally toward the agitator shaft axis, and means on the head operative upon reversal of the shaft rotation, to impart to the substance within the shell a current of flow longitudinally of the shell and toward the discharge port thereof.

11. An agitator for working a mass of substance within a dry rendering cooker of the type including a cylindrical shell closed at its ends, one end having a closable discharge port therein, a rotatable shaft extending axially of the shell, and means for selectively rotating said shaft in forward and reverse directions, said agitator comprising at least one arm, means at one end of the arm securing said arm to the shaft radially thereof, and a head at the opposite end of the arm, said head including a skimming edge in close proximity to the shell for dislodging substance adhering to the inside wall of the shell as the shaft is rotated in the forward direction, a deflecting face on the head disposed for directing toward the agitator shaft the substance dislodged from the shell wall by the skimming edge aforesaid, and a propulsion face on the head disposed obliquely to the plane of rotation of the arm, said propulsion face being angled for moving the agitated substance toward the discharge port at one end of the shell incident to reverse rotation of the agitator shaft.

References Cited in the file of this patent

UNITED STATES PATENTS

| | | |
|---|---|---|
| 609,322 | Aichele | Aug. 16, 1898 |
| 1,045,916 | Twining | Dec. 3, 1912 |
| 2,289,613 | Weinrich | July 14, 1942 |
| 2,646,974 | Read | July 28, 1953 |
| 2,650,807 | Bilek | Sept. 1, 1953 |